UNITED STATES PATENT OFFICE.

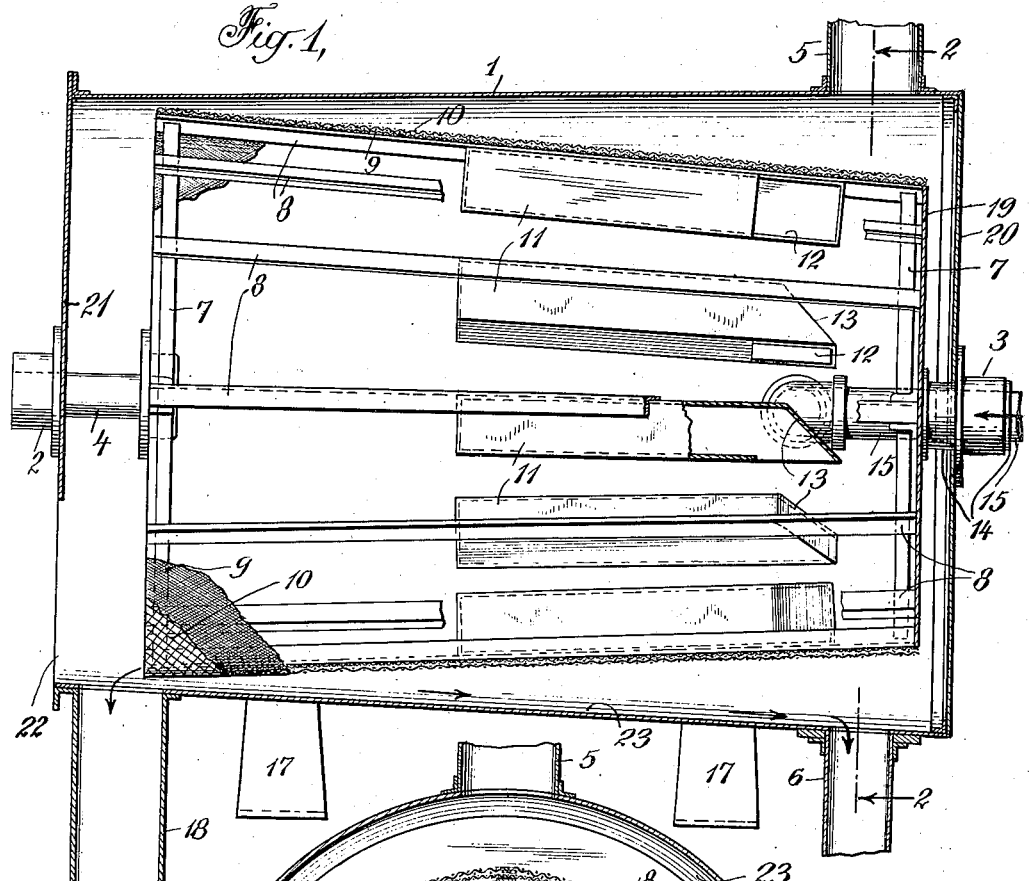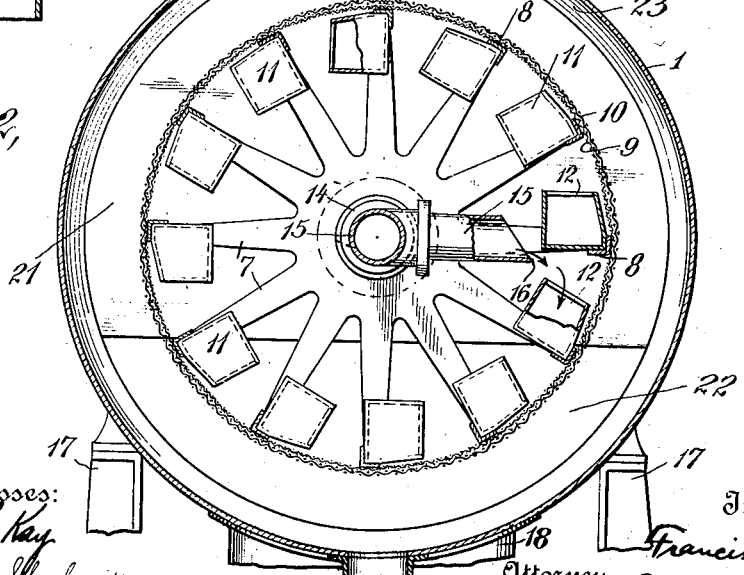

FRANCISCO LARA, OF TRINIDAD, CUBA, ASSIGNOR TO FULTON IRON WORKS, OF ST. LOUIS, MISSOURI, A CORPORATION OF MISSOURI.

SELF-ROTATING SCREEN.

1,157,009.   Specification of Letters Patent.   Patented Oct. 19, 1915.

Application filed June 26, 1915. Serial No. 36,470.

*To all whom it may concern:*

Be it known that I, FRANCISCO LARA, a citizen of the Republic of Cuba, and resident of Trinidad, Cuba, have made a certain new and useful Invention Relating to Self-Rotating Screens, of which the following is a specification taken in connection with the accompanying drawing, which forms part of the same.

This invention relates especially to self-rotating screens or impurity eliminators adapted for use in purifying sugar juices or other liquids from impurities, dirt, etc.

The screen comprises a frame preferably of substantially conical form and covered with screen material around its periphery and mounted on trunnions, one of which is hollow to provide for the supply of liquor through a supply spout within the interior of the screen and adjacent one side of the screen surface. Suitable operating buckets are arranged within the screen to receive the liquor from the supply spout and by their increased weight on this descending side of the screen its continued rotation is effected, the liquor passing through the screen surface while the dirt and other refuse travels down the inclined lower surface of the screen so as to be discharged from its open lower end. The purified liquor which passes through the screen surface is received in a liquor conduit or casing which may surround the screen and is carried toward a liquor drain which may be conveniently arranged adjacent the other end of the casing.

In the accompanying drawings showing in a somewhat diagrammatic way an illustrative embodiment of this invention, Figure 1 is a side elevation, parts being shown in section; and Fig. 2 is a transverse sectional view taken substantially along the line 2—2 of Fig. 1.

The screen may comprise a rigid rotating frame of any suitable material and construction so arranged that its lower side slopes toward one end which is left open for the discharge of the waste material. This frame may be substantially conical and may comprise spiders 7 of cast iron or other suitable material adjacent each end and connected by suitable ribs or channel irons 8 secured to the spiders to form a substantially rigid frame to support the screen material. The fine separating screen 9 which may be of brass wire screen material as fine as 100 meshes to the linear inch may be mounted on these ribs and supported by an outer supporting screen 10 of relatively coarser, stronger material to give mechanical support to the separating screen. This screen may be revolubly mounted in any suitable way as by forming suitable trunnions 4, 14 on the spiders at the ends of the screen and supporting these trunnions in suitable bearings 2, 3. One of these trunnions 14 may be hollow and the supply pipe 15 may be arranged within the same as shown in Fig. 1 and may have its inner end laterally extended so as to form a supply spout 16 adjacent one side of the screen at its receiving end so as to supply the sugar juice or other liquid at this point.

The weight and force of the liquor to be treated is used to revolve the screen through suitable devices or buckets, such as the operating buckets 11, which may be conveniently mounted on the ribs 8 and may be, if preferred, in the form of substantially closed buckets provided with receiving openings 12 adjacent one end in such position as to receive the liquor from the supply spout, this being promoted by an inclined directing plate 13 on which the liquor is received and which tends to direct it along the bucket toward its closed end. As indicated in Fig. 2 the liquor from the supply spout falls into the receiving opening 12 of one of these buckets so as to materially increase its weight and this added weight on the descending side of the screen assists in its rotation so long as the liquor is contained in the bucket. The downward inclination toward its closed end of the bucket which is in liquor receiving position promotes this action and in the present instance this is secured by arranging the buckets substantially parallel to the conical screen surface. The liquor in the bucket begins to discharge therefrom as the bucket approaches its lowest position and shortly after passing beneath the trunnions the buckets are substantially empty so as to offer no considerable resistance to the continued rotary movement of the screen.

The liquor from the supply spout is in part directly received on the adjacent descending screen surface and the liquor which is discharged from the filled buckets also flows against the screen surface adjacent this receiving end of the screen and tends to run down the inclined lower part of the screen surface toward the outer end of the rotating screen. During this movement the liquor penetrates and passes through the screen leaving on the inside of the screen surface any dirt or other relatively solid material which is gradually fed down toward the lower end of the screen by its rotary movement so as to be finally discharged from the open discharge end of the screen which in this case is given a substantially larger diameter than the receiving end which is preferably closed by an end plate 19 to prevent any of the liquor splashing out. As indicated a suitable waste discharge chute 18 is arranged to coöperate with the open end of the screen from which the more solid material is discharged and this dirt and other waste material may thus be conducted to any desired place. A suitable conduit or trough is arranged to conduct the purified liquor in the opposite direction and if desired this conduit 23 may be part of a conical casing 1 substantially inclosing the screen and oppositely arranged with respect thereto, that is, the larger end of the casing incloses the smaller end of the conical screen. In this way the lower portion of the casing or conduit 23 is inclined in the direction opposite to the lower part of the screen and directs the purified liquid toward a suitable liquor drain 6 from which it may be carried to any desired apparatus for further utilization. Where such a conical casing is employed it may be mounted on the support 17 and have its end plates 20, 21 utilized to support the trunnion bearings 3, 2 and it is desirable in most cases to have a suitable inspection opening 22 adjacent the discharge end of the screen so as to take care of any accumulations of dirt or the like and promote their discharge in case of necessity. Where heated sugar liquors are treated the casing may also be provided with a suitable vapor pipe 5 at any convenient upper portion so as to lead away any vapor produced during this screening operation.

This invention has been described in connection with a number of illustrative forms, parts, arrangements, materials and proportions, to the details of which disclosure the invention is not of course to be limited, since what is claimed as new and what is desired to be secured by Letters Patent is set forth in the appended claims.

I claim—

1. In self-rotating screens, a substantially conical frame covered with screen material and formed of spiders and connected angle iron ribs, trunnions formed on said spiders and engaging bearings to support the lower part of the screen in inclined position, the trunnion adjacent the smaller end of said screen being hollow, a supply pipe extending through said hollow trunnion and having a supply spout within the screen extending toward its descending side, substantially closed operating buckets mounted within said screen on said ribs and formed with a receiving opening and with an inclined directing plate to be engaged by the liquor from the supply spout, said buckets receiving liquor from said spout to cause the continued rotation of said screen, a plate substantially closing the smaller end of said screen, a waste discharge chute coöperating with the lower larger open end of said screen from which the more solid material is discharged, an operatively arranged conical casing substantially inclosing said conical frame and forming at its lower portion a liquor conduit directing the liquor from said waste discharge chute, a liquor drain communicating with said conduit and a vapor pipe connected to said casing adjacent the upper portion thereof.

2. In self-rotating screens, a substantially conical frame covered with screen material and formed of spiders and connected ribs, trunnions formed on said spiders and engaging bearings to support the lower part of the screen in inclined position, the trunnions adjacent the smaller end of said screen being hollow, a supply pipe extending through said hollow trunnion and having a supply spout within the screen extending toward its descending side, operating buckets mounted within said screen and formed with a receiving opening and with an inclined directing plate to be engaged by the liquor from the supply spout, said buckets receiving liquor from said spout to cause the continued rotation of said screen, a plate substantially closing the smaller end of said screen, a waste discharge chute coöperating with the lower larger open end of said screen from which the more solid material is discharged, and an oppositely arranged conical casing substantially inclosing said conical frame and forming at its lower portion a liquor conduit directing the liquor from said waste discharge chute.

3. In self-rotating screens, a substantially conical frame covered with screen material and formed of spiders and connected ribs, trunnions formed on said spiders and engaging bearings to support the lower part of the screen in inclined position, the trunnion adjacent the smaller end of said screen being hollow, a supply pipe extending through said hollow trunnion and having a supply spout within the screen extending toward its descending side, operating buckets mounted within said screen and receiving liquor from said spout to cause the continued rotation of said screen, a waste discharge chute coöperating with the lower larger open end of said screen from which the more solid material is discharged and a casing substantially inclosing said conical frame and forming at its lower portion a liquor conduit directing the liquor from said waste discharge chute.

4. In self-rotating screens, a substantially conical frame covered with screen material and formed of spiders and connected angle iron ribs, trunnions formed on said spiders and engaging bearings to support the lower part of the screen in inclined position, the trunnion adjacent the smaller end of said screen being hollow, a supply pipe extending through said hollow trunnion and having a supply spout within the screen extending toward its descending side, substantially closed operating buckets mounted within said screen on said ribs and formed with a receiving opening and with an inclined directing plate to be engaged by the liquor from the supply spout, said buckets receiving liquor from said spout to cause the continued rotation of said screen, a plate substantially closing the smaller end of said screen, a waste discharge chute coöperating with the lower larger open end of said screen from which the more solid material is discharged, and a liquor conduit directing the liquor away from said waste discharge chute.

5. In self-rotating screens, a substantially conical frame covered with screen material and formed of spiders and connected ribs, trunnions formed on said spiders and engaging bearings to support the lower part of the screen in inclined position, the trunnion adjacent one end of said screen being hollow, a supply pipe extending through said hollow trunnion and having a supply spout within the screen extending toward its descending side, operating buckets mounted within said screen and formed with a receiving opening and with an inclined directing plate to be engaged by the liquor from the supply spout, said buckets receiving liquor from said spout to cause the continued rotation of said screen, a plate substantially closing the smaller end of said screen, a waste discharge chute coöperating with the lower larger open end of said screen from which the more solid material is discharged, and a liquor conduit directing the liquor away from said waste discharge chute.

6. In self-rotating screens, a substantially conical screen, trunnions to support the lower part of the screen in inclined position, the trunnion adjacent one end of said screen being hollow, a supply pipe extending through said hollow trunnion and having a supply spout within the screen extending toward its descending side, operating buckets mounted within said screen and receiving liquor from said spout to cause the continued rotation of said screen, a waste discharge chute coöperating with the lower larger open end of said screen from which the more solid material is discharged, and a liquor conduit directing the liquor away from said waste discharge chute.

7. In self-rotating screens, a substantially conical screen, trunnions to support the lower part of the screen in inclined position, the trunnion adjacent one end of said screen being hollow, a supply pipe extending through said hollow trunnion and having a supply spout within the screen extending toward its descending side, operating buckets mounted within said screen and receiving liquor from said spout to cause the continued rotation of said screen, a waste discharge chute coöperating with the lower larger open end of said screen from which the more solid material is discharged and a casing substantially inclosing said screen and forming a liquor conduit directing the liquor away from said waste discharge chute.

8. The self-rotating screen comprising a frame covered with screen material and revolubly mounted to have an inclined lower portion arranged to discharge the more solid material adjacent the lower open discharge end of the screen, liquor supply means to supply liquor to the inside of said screen at its receiving end remote from its discharge end and substantially closed operating buckets mounted on said screen frame to coöperate with said liquor supply means and to receive liquor while in an inclined position and to cause the rotation of said screen, said buckets automatically discharging the liquor adjacent the receiving end of said screen when said buckets are adjacent their lowest position.

9. The self-rotating screen comprising a frame covered with screen material and revolubly mounted to have an inclined lower portion arranged to discharge the more solid material adjacent the lower open discharge end of the screen, liquor supply means to supply liquor to the inside of said screen remote from its discharge end and operating buckets mounted on said screen to coöperate with said liquor supply means and to receive liquor while in an inclined position and cause the rotation of said screen, said buckets automatically discharging the liquor adjacent the receiving end of said screen when said buckets are adjacent their lowest position.

10. The self-rotating screen comprising a frame covered with screen material and revolubly mounted to have an inclined lower portion arranged to discharge the more solid material adjacent the lower discharge end of the screen, liquor supply means to supply liquor to the inside of said screen remote from its discharge end and operating buckets mounted on said screen to coöperate with said liquor supply means and to cause the rotation of said screen.

11. The self-rotating screen comprising a frame provided with screen material and revolubly mounted to discharge the more solid material adjacent the discharge end of the screen, liquor supply means to supply liquor to the inside of said screen remote from its discharge end and operating buckets mounted on said screen to coöperate with said liquor supply means and to cause the rotation of said screen.

12. The self-rotating screen comprising a conical frame covered with screen material and revolubly mounted to have an inclined lower portion arranged to discharge the more solid material adjacent the lower discharge end of the screen, means to supply liquor to the inside of said screen at its receiving end opposite to its discharge end, and operating buckets mounted on said screen to coöperate with said liquor supply means and to receive liquor and cause the rotation of said screen, said buckets automatically discharging the liquor adjacent the receiving end of said screen.

13. The self-rotating screen comprising a conical frame covered with screen material and revolubly mounted to discharge the more solid material adjacent the lower discharge end of the screen, means to supply liquor to the inside of said screen and operating buckets mounted on said screen to coöperate with said liquor supply means and to receive liquor and cause the rotation of said screen.

FRANCISCO LARA.

Witnesses:
HARRY L. DUNCAN,
L. SANFORD.